United States Patent [19]

Sakamoto et al.

[11] 4,145,087
[45] Mar. 20, 1979

[54] SYSTEM FOR HYDRAULICALLY TRANSPORTING SOLID MATERIAL

[75] Inventors: Masakatsu Sakamoto, Matsudo; Kenji Uchida, Kashiwa; Isao Honma, Abiko, all of Japan

[73] Assignee: Hitachi, Ltd., Japan

[21] Appl. No.: 794,346

[22] Filed: May 6, 1977

[30] Foreign Application Priority Data

May 12, 1976 [JP] Japan ................. 51-53273

[51] Int. Cl.² .............................................. B65G 53/30
[52] U.S. Cl. ....................................... 302/14; 209/1; 209/17
[58] Field of Search ................. 209/1, 155, 17, 172.5, 209/2; 302/14; 141/9, 44, 45, 100

[56] References Cited

U.S. PATENT DOCUMENTS

| | | | |
|---|---|---|---|
| 1,650,239 | 11/1927 | Schmidt | 209/17 |
| 1,990,446 | 2/1935 | Allen | 302/14 |
| 2,135,957 | 11/1938 | Wuensch | 209/172.5 X |
| 2,276,075 | 3/1942 | Wuensch | 209/172.5 X |
| 2,320,519 | 6/1943 | Hirst | 209/172.5 |
| 2,325,149 | 7/1943 | Rakowsky | 209/172.5 X |
| 2,793,082 | 5/1957 | Gardner | 302/14 |
| 2,949,190 | 8/1960 | Pagnutti | 209/172.5 |
| 3,246,750 | 4/1966 | Chase | 209/172.5 X |
| 3,371,965 | 3/1968 | MacLellan | 302/14 |
| 3,637,263 | 1/1972 | Wasp | 302/14 |
| 3,942,841 | 3/1976 | McCain | 302/14 |

*Primary Examiner*—Robert Halper
*Attorney, Agent, or Firm*—Craig & Antonelli

[57] ABSTRACT

In transporting solid material of a wide particle size distribution ranging from small to large size particles, a liquid is added to the solid material as a transporting medium to convert the solid material into a slurry to be hydraulically transported. The slurry that has performed the function of transporting the solid material is passed through a water removing device and a solid-liquid separating device to produce a suspension which is stored in a heavy medium tank and returned, after adjusting the concentration of the solid material therein, to the starting point of transportation so that the suspension can be recycled for use as a heavy transporting medium.

4 Claims, 1 Drawing Figure

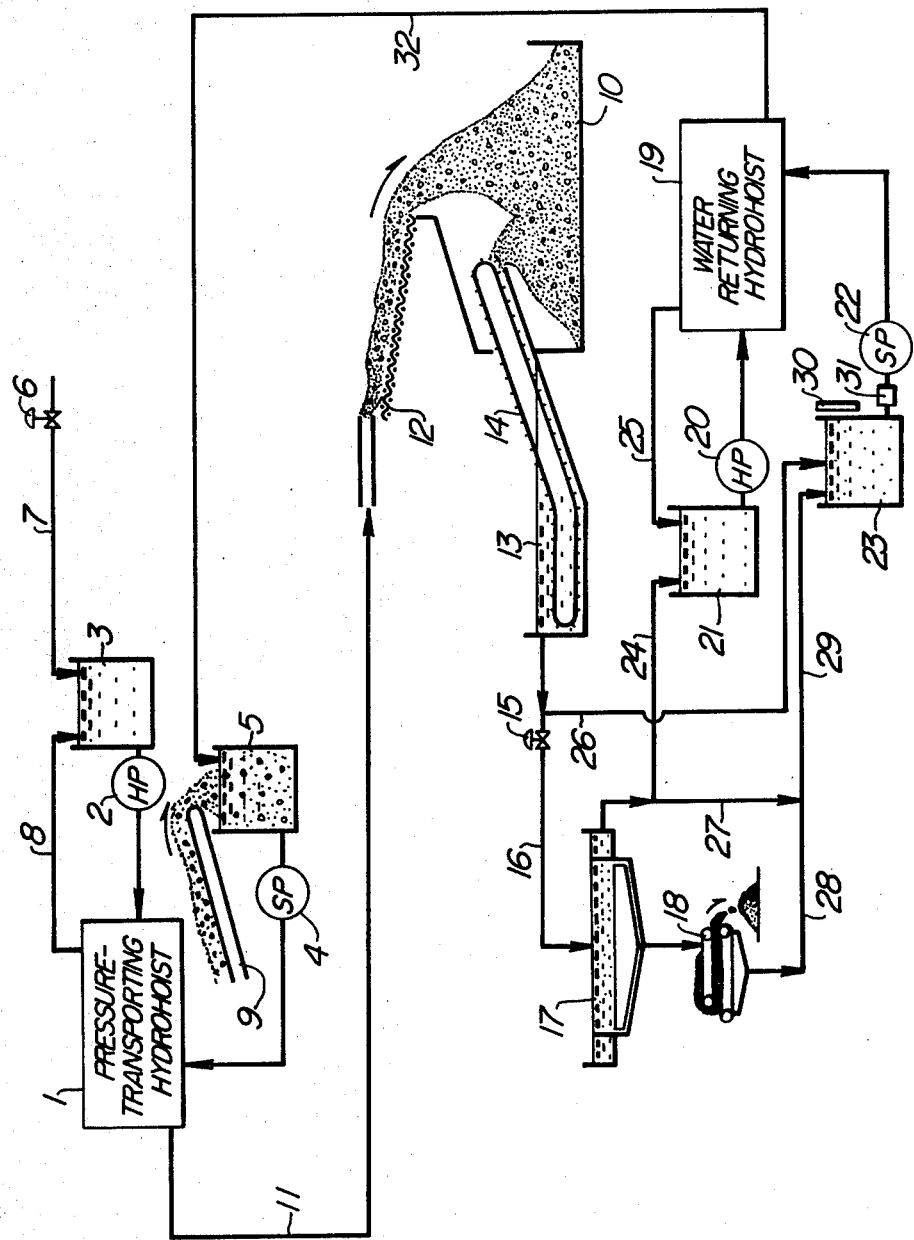

SYSTEM FOR HYDRAULICALLY TRANSPORTING SOLID MATERIAL

This invention relates to systems for hydraulically transporting solid material of a wide particle size distribution ranging from small to large particles, and more particularly to a system of the type described in which a suspension of fine particles removed from the mixture after completion of transportation of the solid material is recycled and used as a heavy medium for hydraulic transportation of the solid material.

As used herein, and as will become apparent from the detailed description of the invention which follows, the term "heavy medium" refers to the aqueous suspension of fine particles which remains after the large-and small-sized particles have been seaparated from the mixture and which is recycled in the system for use as a transportation medium.

Known apparatus for hydraulically transporting solid material include, for example, hydrohoists disclosed in U.S. Pat. Nos. 3,556,682 and 3,938,912. In these apparatus, a liquid is used as a medium of transportation and added to solid material to convert the same into a slurry for hydraulic transportation thereof. The present practice is that the liquid discharged from the hydraulic transporting system after completion of transportation of the slurry is treated by means of water treating installations or, when such apparatus are used in mines for transportation of ores, a slurry containing small solid particles is returned to the starting point of transportation to fill the excavation with such slurry. However, some disadvantages are associated with the aforementioned system of the prior art. In the prior art, it is necessary to use water treating installations of a large size, and difficulty is encountered in satisfactorily effecting maintenance of various machinery and equipment. Also, it is only in some specific mines that a small solid particles containing slurry can be returned to the starting point of transportation, and the general tendency is that all the liquid discharged from the system after completion of transportation is subjected to water treatment. This not only causes an increase in installation cost but also gives rise to the problem of environmental pollution.

SUMMARY OF THE INVENTION

Accordingly, this invention has as its object the provision of a system for hydraulically transporting solid material wherein the liquid discharged after completion of transportation of the solid material is recycled for use in hydraulic transportation of the solid material to thereby avoid the problem of environmental pollution by the discharged liquid.

According to the invention, there is provided a system for hydraulically transporting solid material comprising a first hydrohoist for transporting under pressure solid material of a wide particle size distribution ranging from small to large particles, water removing means for removing water from a slurry transported by such first hydrohoist so as to separate particles of a relatively large size from the slurry, solid-liquid separating means for taking out particles of a relatively small size from a portion of a mixture of water and small solid particles obtained by such water removing means, a heavy medium tank for keeping constant the concentration of solid material in a heavy medium supplied from the water removing means and the solid-liquid separating means, and a second hydrohoist for returning the heavy medium from the heavy medium tank to the first hydrohoist so that the removed liquid can be recycled for use as a heavy medium in hydraulic transportation of the solid material.

The drawing is a schematic view of the system for hydraulically transporting solid material comprising a preferred embodiment of the invention.

A preferred embodiment of the invention will be described with reference to the accompanying drawing, in which the numeral 1 designates a pressure-transporting hydrohoist which is of a known type. The pressure-transporting hydrohoist 1 receives a supply of clear water from a clear water tank 3 by means of a high pressure clear water pump 2, and also a supply of slurry from a mixing tank 5 by means of a slurry pump 4.

Clear water is fed to the clear water tank 3 through a feed water line 7 mounting a flow rate control valve 6 therein, and a quantity of clear water remaining in the pressure-transporting hydrohoist 1 after a slurry has been transported under pressure is returned to the clear water tank 3 through a return water line 8. Meanwhile solid material is fed to the mixing tank 5 by means of a conveyor 9 and at the same time a heavy solution is supplied through a line 32 from a water returning hydrohoist 19 subsequently to be described.

The pressure-transporting hydrohoist 1 is connected to a storage yard 10 through transporting piping 11. In the storing place 10, there are provided a water removing device and a solid-liquid separating device. The water removing device comprises a screen 12 for separating solid material of a relatively large particle size from a mixture of water and solid material, a settling pond 13 for receiving the mixture of water and solid material of a relatively small particle size that has passed through the screen 12, and a double chain conveyor 14 for scooping up the solid material of a relatively small particle size deposited on the bottom of the settling pond 13. The solid-liquid separating device comprises a thickener 17 for concentrating a slurry consisting of water and solid material of a relatively small particle size introduced thereinto through an overflow line 16 connected to the settling pond 13 and mounting a flow rate control valve 15 therein, and a dehydrator 18, such as a belt press, for further removing water from the slurry consisting of water and solid material of a relatively small particle size concentrated by the thickener 17.

The water returning hydrohoist 19 is of a known type and the same construction as the pressure-transporting hydrohoist 1. The water returning hydrohoist 19 receives a supply of clear water from a clear water tank 21 by means of a high-pressure clear water pump 20, and a supply of heavy medium from the heavy medium tank 23 by means of a slurry pump 22. A supernatant in the thickener 17 is introduced through an overflow line 24 into the clear water tank 21 which also receives returned water through a line 25 from the returning hydrohoist 19, such water remaining therein after the heavy medium has been returned under pressure to the mixing tank 5. Meanwhile water overflowing the settling pond 13 is introduced through a line 26 to the heavy medium tank 23. At the same time, water overflowing the thickener 17 and flowing through a line 27 and water discharged from the dehydrator 18 and flowing through a line 28 are also introduced into the heavy medium tank 23 through a line 29. The heavy medium tank 23 is provided with a liquid level detector 30 and a densimeter 31.

The operation of the embodiment constructed as aforesaid will now be described. A slurry of solid material of a wide particle size distribution is transported by the pressure-transporting hydrohoist 1 through the transporting piping 11 to the screen 12. The solid material of a relatively large particle size which does not pass through the screen 12 is fed to the storage yard 10, while a slurry consisting of water and the solid material of a relatively small particle size passes through the screen 12 and drops into the settling pond 13. Of the particles of the solid material in the slurry that have dropped into the settling pond 13, the particles larger in size than 0.15 mm., for example, are scooped up by the double chain conveyor 14 and delivered to the storage yard 10.

Water overflowing the settling pond 13 thus contains small particles of the solid material which are less than 0.15 mm. in size. A portion of the overflowing water is delivered through the overflow line 16 to the thickener 17 where it is concentrated. Then the concentrated overflowing water is dehydrated by the dehydrator 18, so that the small particles of the solid material are taken out in cake form. On the other hand, the thickener 17 contains a supernatant which is clear water containing no solid material in small particle form. A portion of such supernatant is introduced through a line 24 into the clear water tank 21, and the rest of the supernatant is introduced into the heavy medium tank 23 through lines 27 and 29. The supernatant thus introduced into the heavy medium tank 23 is returned through line 32, together with heavy medium introduced into the heavy medium tank 23 through line 26 from the settling pond 13 and containing small particles (less than 0.15 mm. in size) of the solid material, to the mixing tank 5 associated with the pressure-transporting hydrohoist 1.

While the particles of solid material are undergoing dehydration, the mother liquor (clear water) will be reduced in quantity by sticking to the solid particles or evaporating. Thus the quantity of the liquid introduced into the heavy medium tank 23 is not constant. To cope with this situation, the quantity of the heavy medium recovered from the slurry is measured by means of the liquid level detector 30 mounted in the heavy medium tank 30, and the quantity of water which need be fed to the clear water tank 3 associated with the pressure-transporting hydrohoist 1 to maintain the flow rate of water in the entire system at a predetermined level, is calculated. A signal is supplied on the basis of the value obtained by calculation to the flow rate control valve 6 in the feed water line 7 so as to operate the valve 6 to adjust the quantity of water fed to the clear water 3.

If the overflowing water from the settling pond 13 is used as it stands for recirculation through the system, there is a possibility that the reuse of the recovered water will become impossible due to the influences of viscosity because the density of solid material in the heavy medium gradually increases. To eliminate this possibility, the density of the solid material in the heavy medium is detected by the densimeter 31 mounted at the heavy medium tank 23, and a signal representing the result of detection is supplied to the flow rate control valve 15 mounted in the overflow line 16 connected to the settling pond 13 to operate such valve. This enables the amount of the small particles of solid material taken out by the solid-liquid separating device to be controlled so as to thereby keep constant the density of the solid material in the heavy medium tank 23.

The system for hydraulically transporting solid material constructed and operating according to the invention as aforesaid offers the following advantages:

1. The water (heavy medium) removed from the slurry is recycled for use as a transporting medium. This makes it possible to minimize the size of installations for treating a slurry incorporating therein small particles of solid material which raises a problem in separating the solid from the liquid.
2. Since the waste water produced after separating the solid from the liquid is not released from the system for disposal, no problem of environmental pollution arises.
3. Since the system is in continuous operation, one has only to feed water to the clear water tank associated with the pressure-transporting hydrohoist, and the amount of water to be supplied thereto can be determined automatically depending on the quantity of heavy medium recovered.
4. The particles of solid material can be transported while being suspended in a heavy medium. This permits the critical velocity to be reduced, so that less wear is caused on the transporting piping and the power requirement can be reduced.

What we claim is:

1. A system for hydraulically transporting solid material comprising:
    a. a first hydrohoist disposed at the starting point of the transportation of transporting, under pressure, particulate solid materials of a wide particle size distribution ranging from small to large particles;
    b. a mixing tank for adding a heavy medium consisting of water and fine particles to said particulate solid materials to turn the latter into slurry;
    c. a slurry pump connected to said mixing tank and to said first hydrohoist to transfer said slurry from said mixing tank to said first hydrohoist;
    d. a first clear water tank for supplying clear water to said slurry in said first hydrohoist;
    e. a first high-pressure clear water pump connected to said first clear water tank and to said first hydrohoist for forcibly supplying said clear water from said first clear water tank to said first hydrohoist;
    f. transporting piping connected at its beginning end to said first hydrohoist through which said slurry is transported under pressure by said first hydrohoist;
    g. a water removing device disposed at the terminating end of said transporting piping for removing particles of relatively large particle sizes from said slurry;
    h. a solid-liquid separating device for removing particles of relatively smaller particle sizes from the portion of the slurry separated by said water removing device and for producing a slurry consisting of water and fine particles constituting a heavy medium;
    i. a heavy medium tank connected to said water removing device and said solid-liquid separating device for receiving said slurry consisting of water and fine particles and for maintaining a predetermined density of said heavy medium;
    j. densimeter and liquid level detecting means attached to said heavy medium tank;
    k. a pipe connecting said water removing device to said solid-liquid separating device for delivering said slurry consisting of water and fine particles from said water removing device to said solid-liquid separating device;
l. a flow rate control valve disposed in the pipe defined in (k) above, for controlling the flow rate of said slurry consisting of water and fine particles delivered to said solid-liquid separating device in accordance with the density and the liquid level detected by said densimeter and said liquid level detecting means, thereby to control the concentration of said heavy medium in said heavy medium tank;
m. a second hydrohoist connected to said heavy medium tank for returning said heavy medium to said starting point of transportation;
n. a second clear water tank for supplying clear water for transporting said heavy medium by said second hydrohoist;
o. a second high-pressure clear water pump connected to said second clear water tank and to said second hydrohoist for forcibly supplying clear water from said second clear water tank to said second hydrohoist; and
p. return piping connecting said second hydrohoist to said mixing tank disposed at the starting point of transportation for returning said heavy medium to said mixing tank,
whereby said heavy medium is recycled to suspend and transport further particulate solid materials.

2. A system for hydraulically transporting solid material as claimed in claim 1, wherein the quantity of water supplied to said first hydrohoist is controlled in accordance with an increase or a decrease in the liquid level of said heavy medium tank.

3. A system for hydraulically transporting solid material as claimed in claim 1, wherein said water removing means comprises a screen for separating relatively large particles of the solid material from a mixture of water and solid material, a settling pond of a slurry consisting of water and small particles of the solid material passed by the screen, and a conveyor for scooping up small particles of the solid material deposited on the bottom of the settling pond.

4. A system for hydraulically transporting solid material as claimed in claim 1, wherein said solid-liquid separating means comprises a thickener for concentrating a slurry consisting of water and solid material of a relatively small particle size, and a dehydrator for further removing water from the slurry consisting of water and solid material of a small particle size concentrated by the thickener.

* * * * *